United States Patent [19]

Wolf et al.

[11] B 4,009,447

[45] Feb. 22, 1977

[54] AMPLIFIER ARRANGEMENT WITH ZEROING DEVICE FOR PIEZOELECTRIC TRANSDUCERS

[75] Inventors: Hans-Joachim Wolf, Freienstein; Franz Meier, Hettlingen; Hans Ulrich Baumgartner, Winterthur, all of Switzerland

[73] Assignee: Kistler Instrumente AG, Winterthur, Switzerland

[22] Filed: July 20, 1973

[21] Appl. No.: 381,006

[44] Published under the second Trial Voluntary Protest Program on April 6, 1976 as document No. B 381,006.

[30] Foreign Application Priority Data

July 28, 1972 Switzerland .................. 11465/72

[52] U.S. Cl. ................................ 330/110; 310/8.1; 330/59
[51] Int. Cl.² ................................ H03F 1/36
[58] Field of Search ............... 330/110, 29, 9, 51; 324/123 C, 123 R, 109; 310/8.1; 73/DIG. 4, 194 R

[56] References Cited

UNITED STATES PATENTS

| | | | |
|---|---|---|---|
| 3,054,951 | 9/1962 | Richard | 324/123 R X |
| 3,129,326 | 4/1964 | Balaban | 235/183 |
| 3,225,304 | 12/1965 | Richards | 330/110 X |
| 3,449,741 | 2/1965 | Egerton, Jr. | 340/347 |
| 3,541,462 | 11/1970 | Sarkisian et al. | 330/9 X |
| 3,711,783 | 1/1973 | Kelling | 330/29 X |
| 3,760,287 | 9/1973 | Harris | 330/51 X |
| 3,765,239 | 10/1973 | Olsson | 73/194 R |

*Primary Examiner*—James B. Mullins
*Attorney, Agent, or Firm*—Craig & Antonelli

[57] ABSTRACT

A measuring circuit including a piezoelectric transducer contains an output charge amplifier circuit with a semiconductor element connected across the storage element of the charge amplifier. The semiconductor element controls the resetting or zeroing of the storage element to thereby effect control of the operation of the charge amplifier. Typically, the semiconductor element may be a field effect transistor, photo-device, etc., and the control of the same may be remotely controlled.

20 Claims, 12 Drawing Figures

SPATIAL LAYOUT OF CHARGE AMPLIFIER
IN PIEZOELECTRIC TRANSDUCER

AMPLIFIER ARRANGEMENT WITH ZEROING DEVICE FOR PIEZOELECTRIC TRANSDUCERS

A fundamental problem occurring in metrology and control engineering is the amplification of a very small electrical variable into one that can be exploited for measuring, recording and control purposes and in this regard various types of measuring amplifiers are employed. As an important secondary function in such operations, every measuring amplifier must be adjusted to a certain value at the beginning of a measurement, usually zero if the measured value at the transducer is zero.

Only after this does the phenomenon to be measured commence. Upon its completion, when the measured value is zero again for example, the measuring amplifier is set to the initial value of zero once more and kept there until a new measuring operation is initiated. In most cases, the measuring amplifier delivers a voltage as an output signal, usually of the order of 0 to +10 V.

With such measuring amplifiers, therefore, before starting a measuring operation the amplifier output must be adjusted to 0 V by means of a switching operation known as zeroing or resetting.

Further consideration here will be directed mainly to an electrometer and charge amplifiers as are used, for example, in piezoelectric metrology to convert relatively weak signals from piezoelectric transducers into proportional measuring and control voltages. For initiating reset, mechanical relays are employed in such transducers. On account of their operational reliability and small dimensions so-called reed relays as described in Swiss Pat. No. CH 502 690 have won acceptance for this duty. On all such relays the switchover is performed by means of mechanically operated conductors, which are moved by building-up or removing magnetic or electric fields, with attendant disadvantages and undesirable side effects.

In the first place these zeroing operations take a relatively long time. Secondly there are always disturbing charges in the proximity of these relays, which are located on the glass surfaces near to the melted-in contacts and cannot be led off again. After a "zeroing" of this kind the result is a residual voltage set up by static induction, which cannot be removed even by repeated resettings. While a variety of proposals have been made for overcoming this difficulty, no satisfactory solution has emerged.

Considerable difficulties are experienced in the design of miniature amplifiers owing to the mechanical variable and the need to operate the relays mechanically. When such miniature amplifiers are to be combined with piezoelectric transducers to form a unit, however, the problems become almost insurmountable. For the industrial application of piezoelectric transducers in particular, the miniature amplifier has to be located in the immediate proximity of the transducer, so that the signal leads to the evaluating instruments may consist of simple, uncritical cable connections involving no particularly stringent requirements in the way of insulation.

In view of all these problems this invention adopts a new approach, eliminating the use of mechanically operated relays or switches for zeroing miniature amplifiers. Instead, controllable semiconductor elements are employed, controlled not by the magnetic action of a current, but by a voltage, for instance. By eliminating all mechanically moved elements, all static induction is prevented, and the energy required for resetting is incomparably smaller. In particular, however, the time taken is shortened by orders of magnitude. Entirely new possibilities are opened up by this, especially where the circuitry has to be accommodated in a miniature amplifier which is to be fitted in the immediate proximity of the transducer or actually inside it. In one major embodiment of the invention, the current supply, signal transmission and triggering of a reset can be transmitted via a lead of the cable, allowing a simple plug-and-socket and cable connection to be used.

An important advantage of the zeroing device using a semiconductor is that the semiconductor protects the input transistor, which is usually a field effect transistor with insulated control electrode, against overvoltages. Because the inputs of electrometer and charge amplifiers have input impedances of the order of $10^{14}$ ohm, the electrostatic charges often caused by friction are enough to set up voltages of several hundred volts at the input of such amplifiers, leading to a breakdown of the insulation in the input transistor and a destruction of it.

The semiconductor in the zeroing circuit is also exposed to this static charge, and if the voltage at this element exceeds a certain limiting or breakdown voltage it becomes conductive, leading the static charge away without being destroyed by it if a suitable current limiting resistor is included. Semiconductor elements can be found for the zeroing device having a breakdown voltage below the destruction voltage of the input transistor, so that the latter is protected (see FIG. 9).

The present invention will be more fully explained with reference to the accompanying drawings wherein.

Figure 1:
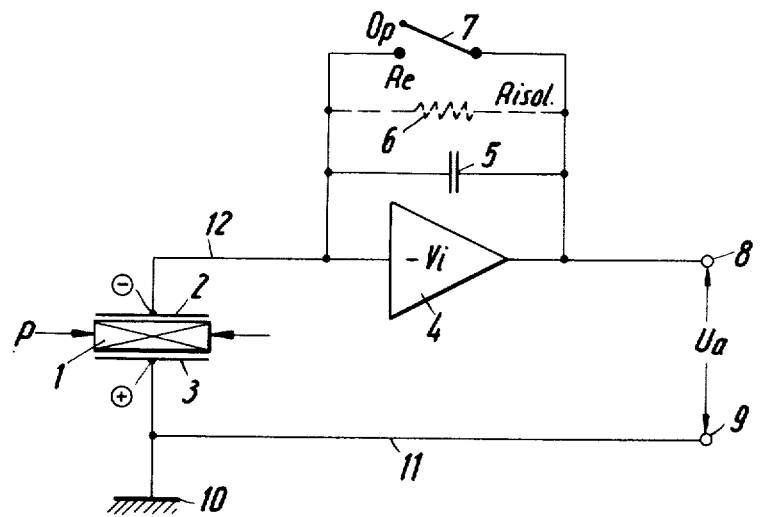
FIG. 1 shows a commercially available measuring amplifier assembly on the charge amplifier principle.

FIG. 1 shows a commercially available measuring amplifier assembly consisting of a piezoelectric crystal 1 on which the forces P act, and the collector electrodes 2 and 3 connected to ground 10 and to direct-current amplifier 4. This amplifier constitutes a charge amplifier with negative feedback capacitance 5 and an input impedance of $10^{14}$ ohm. Usually, the measuring lead 12 is connected to the piezoelectric transducer, which consists of the crystal 1 and electrodes 2 and 3. The charge amplifier 4 is based on the principle of the integrating amplifier (see F. Kohlrausch: "Praktische Physik," 1968, Vol. 2, p. 56), which is also known as a Miller integrator. Compared with the usual Miller integrators, however, it is distinguished by high input impedance and high gain.

Charge amplifiers in conjunction with piezoelectric transducers for measuring mechanical variables are described also in "Electrorevue" No. 48, Nov. 1967, p. 2222, among other references.

Usual capacitances of the negative feedback capacitor 5 lie between 10 pF and 0.1 $\mu$F. To obtain a large time constant R × C of, for example, 1000 sec. with almost static measurements, in the case of the 10 pF capacitor the total effective insulation resistance, represented by resistance 6, must amount to at leas $10^{14}$ ohm.

Before starting a measurement, the negative feedback capacitor is discharged by closing a parallel switch 7, for which the switch is set briefly to the reset position. For the measurement that follows, this switch 7 remains open, i.e., in operation. It will be apparent from the mode of operation that switch 7 must have very high insulation.

Figure 2:
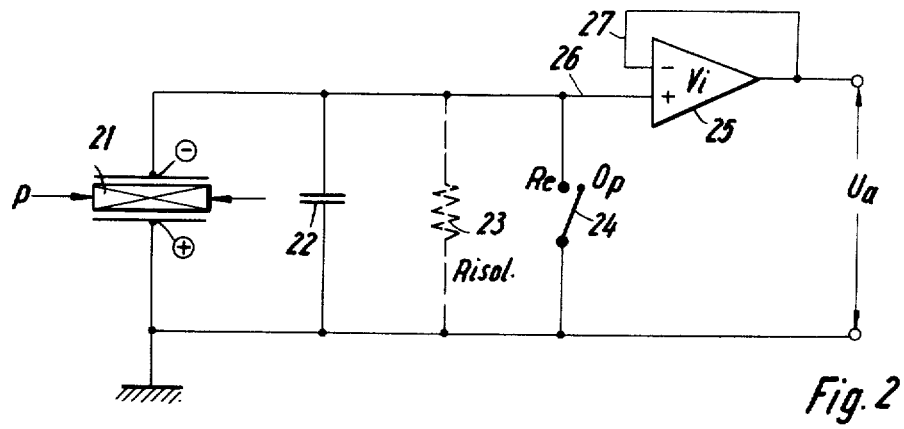
FIG. 2 shows a commercially available measuring amplifier assembly on the electrometer amplifier principle.

FIG. 2 shows an alternative piezoelectric measuring system operating on the voltage amplifier or electrometer principle. By means of the capacitance 22 in parallel with the piezoelectric transducer 21 the sensitivity of the amplifier 25 wired as an impedance transformer is fixed.

In this case, also, the capacitance 22 is short-circuited by means of a relay 24 before measuring commences. Here again, the relay contact 24 must have very high insulation in the opened state. The direct-current amplifier 25 is provided with a difference input and follows the voltage changes produced at the input 26 by the piezoelectric system.

The mechanical switches or relays usually employed for this purpose are mostly of the reed relay type on account of the high insulation resistances demanded. These relays incorporate reeds melted into glass, which are actuated by an externally applied magnetic field.

These reed relays correspond to the latest state of the art and give high insulation values and relatively short switching times; nevertheless, however, they have a number of major disadvantages for this application. For example, the magnetic field needed to trigger them requires a relatively large amount of energy, while on the other hand it gives rise to undesirable induction effects and disturbing charges. Upon resetting relays 7 and 24 for operation, these disturbances cause the notorious zero jump, which is irregular and may have positive or negative voltages. The main cause of these disturbances are charges on the inside wall of the glass tubes of the reed relays customary in the trade. Owing to these disturbing charges, the desired starting position at the commencement of measuring, i.e., voltage at the negative feedback capacitor 5 and 22 = 0 and thus, in the case of an ideal amplifier the initial amplifier voltage, 0V, is in error by an amount corresponding to a few 0.1 pC at the input. Since the charges on the inside of the glass wall of the reed relay which cause the zero jump in the manner described are variable compensation by appropriate zero displacement in the amplifier, for example is ruled out in practice.

Figure 3:
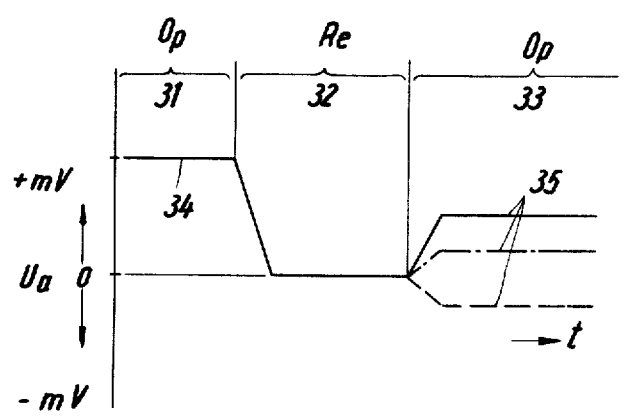
FIG. 3 shows the voltage versus time diagram of a zeroing operation by the usual systems.

FIG. 3 shows a zeroing operation plotted against the time scale as may be recorded with an oscillograph. The initial signal Ua, represented by the line 34, drops to zero during the zeroing phase 32 when the relay contact 7 or 24 is short-circuited, i.e., switched to Re. Upon switching-back, i.e., opening to the operating position, the zero jump takes place with a partly irregular and partly reproducible value 35, which may be positive or negative. The measurement which now follows is in error by this initial error, which in the case of small measured variables often leads to unsatisfactory measuring results.

The invention eliminates the cause of these difficulties by replacing the mechanical relays 7 and 24 with controllable semiconductor elements, which are influenced without magnetic fields and can be actuated much more rapidly and with much less energy expenditure due to the elimination of all mechanical contacting. Interruption is less abrupt, minimizing the errors caused by noise. Similarly, eliminated are errors caused by frictional electricity and thermoelectric voltages.

Moreover, the much smaller dimensions of the semiconductor element in the piezoelectric transducer and amplifier system according to the invention make it possible to construct miniaturized amplifiers on both the charge amplifier and the electrometer amplifier principles. The piezoelectric transducer and amplifier system may be accommodated in a single housing, or else in two housings joined by a cable suited for the arduous temperature and vibration conditions under which the transducer must operate.

Figure 4:
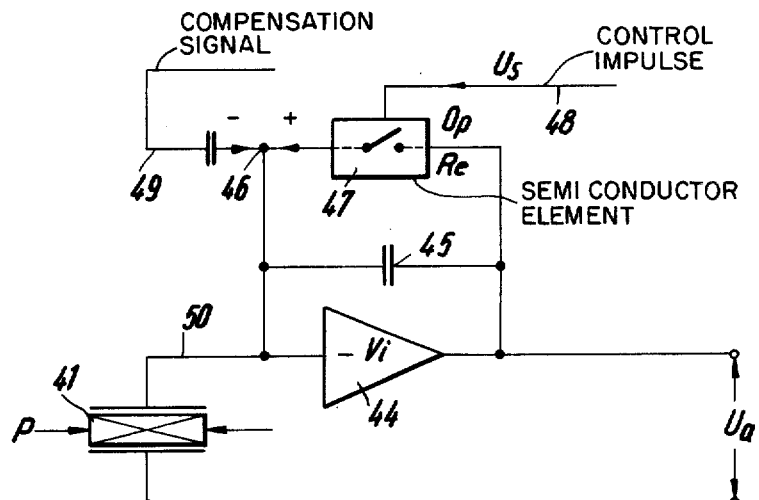
FIG. 4 shows a piezoelectric transducer and amplifier system according to the invention, with semiconductor zeroing device for switching on and off.

FIG. 4 illustrates the idea of a controllable semiconductor element for zeroing the charge amplifier. The piezoelectric transducer 41 is connected by the lead 50 with the charge amplifier 44. The latter is equipped with a negative feedback capacitor 45, which is short-circuited with the controllable semiconductor element 47 or is open. The control impulse for opening (Op) or closing (Re) is given to the semiconductor element through the lead 48. As with the reed relay, the semiconductor element 47 requires very high insulation of the order of $10^{13}$ ohm, at least; this is technically achievable with field effect transistors.

Of paramount importance, however, is the fact that the zero jumps with the semiconductor elements are absolutely reproducible and therefore compensatable. This can be accomplished by feeding in an appropriate compensation signal at point 46 via the lead 49.

Figure 5:
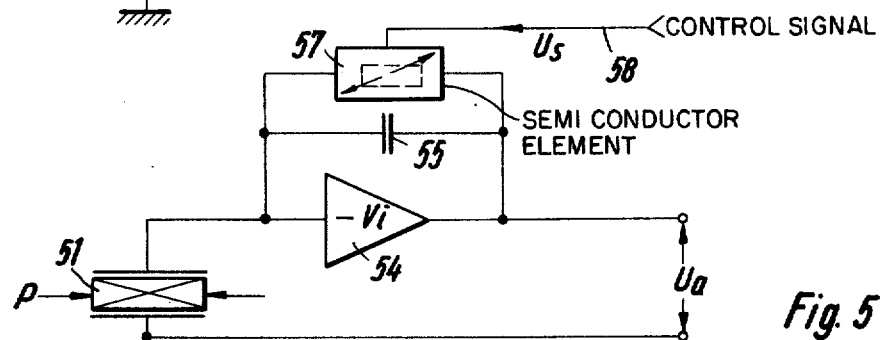
FIG. 5 shows a piezoelectric transducer and amplifier system according to the invention, with semiconductor zeroing device for a stepless operation.

FIG. 5 shows another piezoelectric transducer and amplifier system according to the invention, with piezoelectric crystal 51 and charge amplifier 54. Instead of a semiconductor element operated as a switch, one is used which can be adjusted to any intermediate stages between short circuit and maximum resistance, e.g., $10^8$, $10^9$, $10^{10}$, $10^{11}$ to $10^{13}$ ohm. The magnitude of the effective resistance can be regulated by the control signal 58. With dynamic measurements, this possibility is exploited to determine the lower frequency limit.

Figure 6:
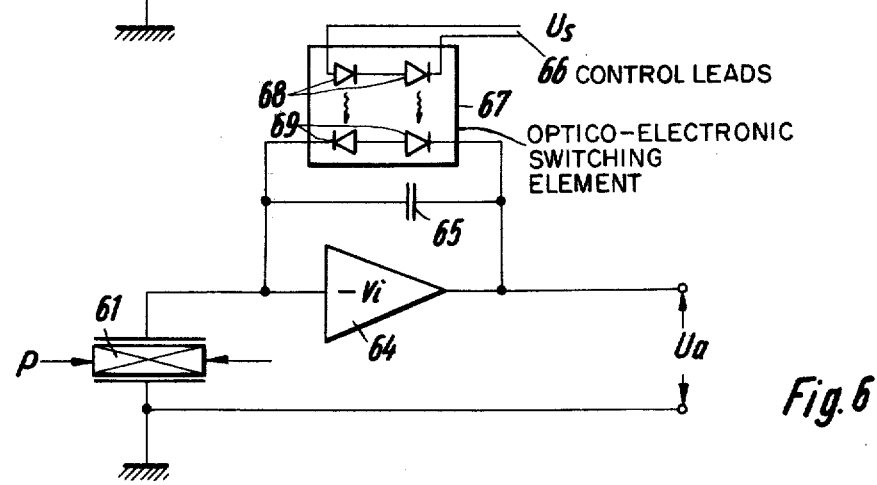
FIG. 6 shows a piezoelectric transducer and amplifier system according to the invention, with a semiconductor zeroing device using an opticoelectrical arrangement.

FIG. 6 shows another alternative piezoelectric transducer and amplifier system with transducer 61 and charge amplifier 64. Instead of a controllable semiconductor element an optico-electronic switching element 67 is used here, for complete or partial short-circuiting of the negative feedback capacitor 65. This switching element 67 consists of two photodiodes 69 in opposition, which can be illuminated by one or two light-emitting diode 68 via the control lead 66.

Other semiconductor elements are conceivable, however, for zeroing the piezoelectric transducer and amplifier according to the invention. Their resistances may be influenced by field effects, light effects or magnetic effects.

To begin with, apart from the bipolar transistor, the thyristor and the metal oxide semiconductor field effect transistor, the surface barrier field effect transistor is particularly suited because it enables especially high resistances to be obtained in the blocked state. A circuit using one of the above-mentioned transistor types as a zeroing device can be varied in accordance with the invention so that after switching-off the operating voltage of the amplifier the zeroing device assumes a low resistance, automatically short-circuiting the negative feedback capacitor. With appropriate circuitry it is then possible to transmit the power feed, signal and reset command with only a two-pole connection between the input amplifier and signal processing part. These possibilities are explained more fully in the other figures.

The piezoelectric transducer and amplifier systems in accordance with the invention described hitherto can be applied without reservation to existing charge or electrometer amplifiers for piezoelectric transducers on which the transducer and amplifier form separate units connected by highly insulating plugs and leads. For industrial applications, however, highly insulating connections are not desirable on account of the greater susceptibility to disturbances.

For such applications it is therefore advantageous if miniature amplifiers can be constructed, which can be located immediately in or on the piezoelectric transducer. They should be equally suited for the charge and electrometer amplifier principles, and whenever possible coaxial long-distance lines to the evaluating instruments should be feasible. Obviously, such a miniature amplifier can be realized only if the size and mode of operation of the zeroing device will allow it, unless short-term static measurements are eliminated.

Figure 7:
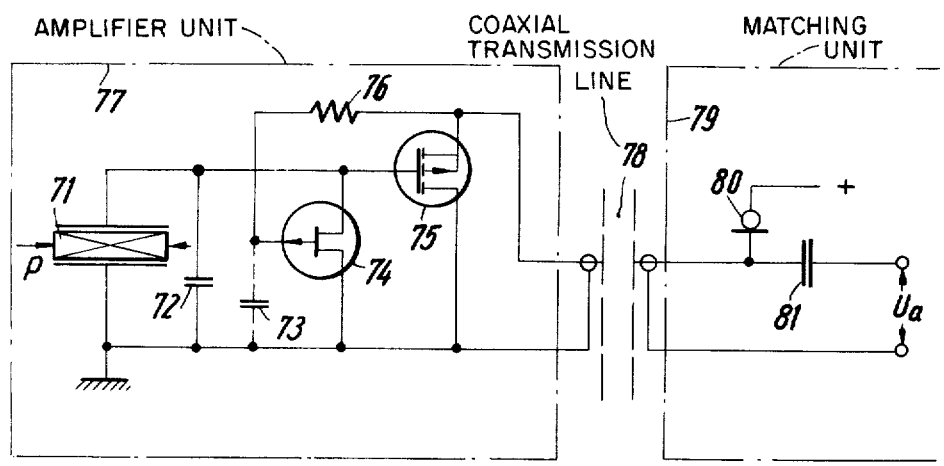
FIG. 7 shows a piezoelectric transducer and amplifier system according to the invention using an electrometer amplifier with semiconductor elements.

FIG. 7 shows an electrometer amplifier circuit suitable for combination with the piezoelectric transducer in miniature design. This would include all components inside the rectangle 77. The matching electronics with power supply and signal evaluation output Ua are shown in the rectangle 79, while 78 represents the coaxial transmission line. The piezoelectric transducer 71 is shown in parallel with a capacitance 72. In certain cases this will consist merely of the inherent capacitance of the transducer and its parts.

The metal oxide semiconductor field effect transistor 75 serves as impedance converter, and the p-channel field effect transistor 74 for short-circuiting the capacitance 72 or the piezoelectric transducer 71 directly. The field effect transistor 74 is controlled by switching the supply voltage on and off via the lead 78 from the matching and power supply unit 79. The field effect transistor 74 is thus arranged so that when unit 79 is switched off any charges that might arise due to the action of force on the piezoelectric transducer 71 are short-circuited constantly. Only upon switching-on is the transistor 74 blocked by the voltage. If necessary, this opening can be delayed by the capacitance 73 until the metal oxide semiconductor field effect transistor 75 is in full action. This ensures that no residual charges from previous measurements are added to the new measurement at the commencement of measuring. If displacements from zero due to other influences become noticeable, such as major temperature variations, these can be easily eliminated if the measurement is interrupted briefly by switching-off the supply voltage.

Instead of the switched field effect transistor 74, one may be used with an adaptable intermediate position similar to FIG. 5, which gives a resistance of $10^{10}$ ohm in the blocked state. For certain changes this enables disturbances due to temperature variations to be corrected automatically, especially with dynamic measurements.

Figure 8:
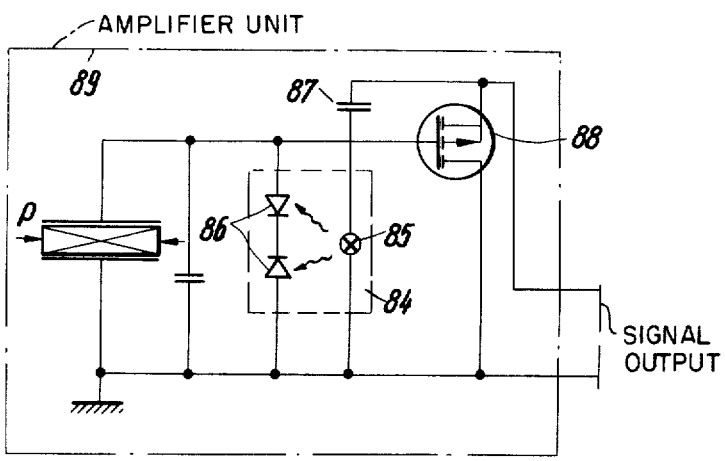
FIG. 8 shows a piezoelectric transducer and amplifier system according to the invention with an electrometer amplifier and light transmission onto counter-connected diodes.

FIG. 8 shows a variant of FIG. 7, differing in the use of an assembly of two diodes 86 in opposition and controlled by the light source 85, instead of the controllable semiconductor element 74.

Figure 9:
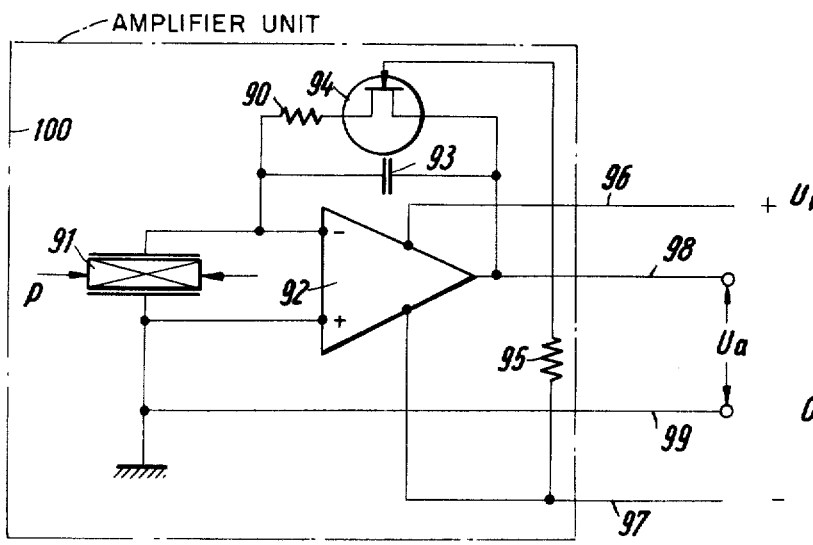
FIG. 9 shows a piezoelectric transducer and amplifier system according to the invention using a charge amplifier circuit.

FIG. 9 shows a configuration operating on the charge amplifier principle similar to FIGS. 4 and 5. The operational amplifier 92 is connected to the piezoelectric transducer and is powered via the leads 96 and 97. To short-circuit the negative feedback capacitor 93 the n-channel field effect transistor 94 is employed, which blocks when the supply voltage is switched on and thus brings the operational amplifier 92 into action. Resistance 95 serves to protect the field effect transistor 74.

The measuring signal is tapped via leads 98 and 99. On account of this the system requires a four-core connection between the combination 100 and the matching electronics not shown. In many cases, especially for industrial applications, the dimensions of the transducer, plug and cable are so large that four-core transmission lines present no particular problems.

Figure 10:
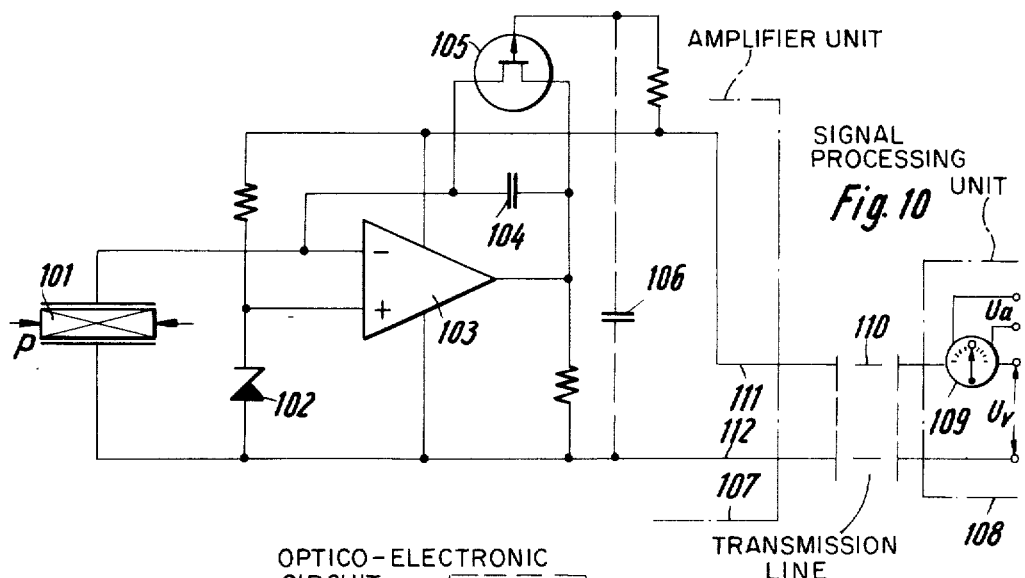
FIG. 10 shows a piezoelectric transducer and amplifier system according to the invention with coaxial transmission to the signal processing unit.

FIG. 10 shows a varient of FIg. 9 in which the charge amplifier circuitry is used once more but a two-core or coaxial transmission line 110 is employed. A configuration of this kind will admit a higher degree of miniaturization, though a somewhat greater outlay is required. The piezoelectric transducer has a direct connection with the operational amplifier 103 and an indirect connection via the Zener diode 102. In another variant, however, it can be connected direct to the + and − input of the operational amplifier 103 as well.

The discharge of the negative feedback capacitor 104 is controlled in turn by the p-field effect transistor 105, which can be operated with a time lag via capacitor 106. By switching-on the current supply via leads 111 and 112, field effect transistor 105 is blocked, bringing the operational amplifier 103 into action. The signal from the piezoelectric transducer 101 is superimposed upon the constant feed current supplied via leads 111 and 112. The signal is then separated from the feed current in the signal processing unit 108.

Figure 11:
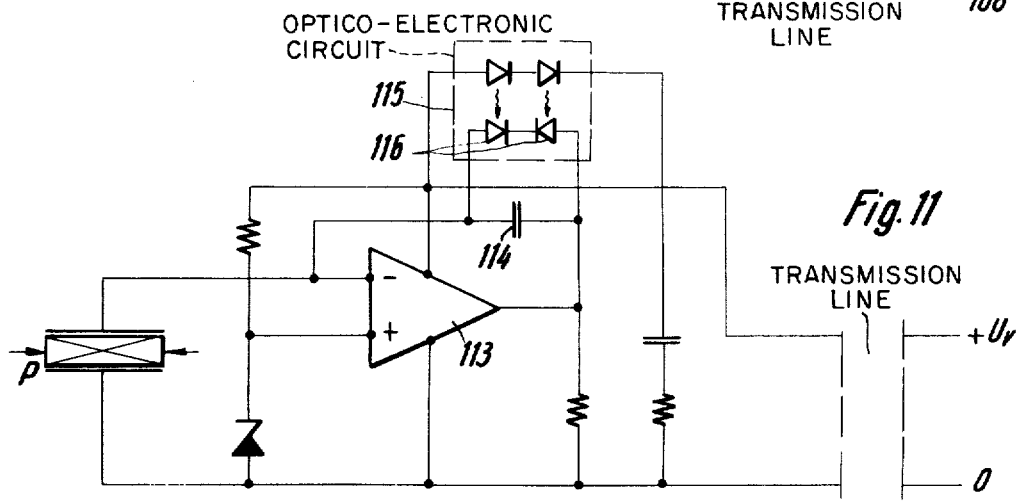
FIG. 11 shows a variant of FIG. 10 with light transmission to open the negative feedback circuit.

FIG. 11 shows a variant of FIG. 10, differing in that the field effect transistor 105 is replaced by the circuit 115, in which two light-controlled diodes are arranged in opposition so that they release the negative feedback capacitor when the feed current is switched on. The signal is evaluated as in FIG. 10, converting the variation of the feed current into a voltage variation by means of an operational amplifier.

Figure 12:
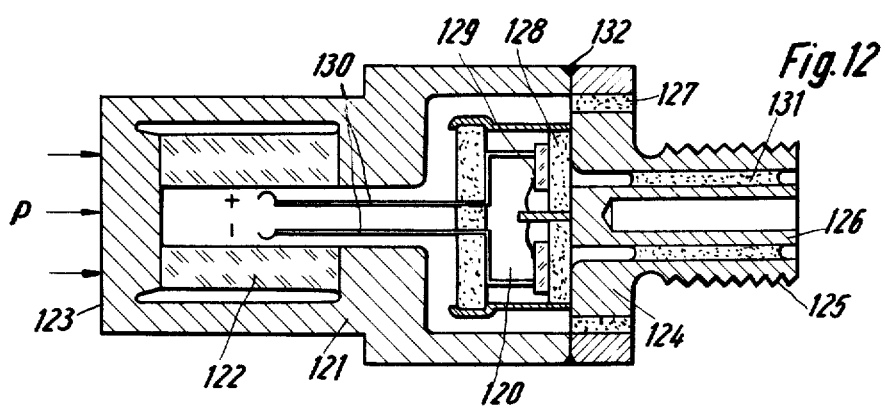
FIG. 12 shows a typical piezoelectric pressure transducer application with an amplifier and a zeroing device formed as a thick film or hybrid circuit.

Finally, FIG. 12 shows a typical spatial layout of a miniature charge amplifier 120 fitted in a piezoelectric transducer 121. The transducer is suitable for measuring pressure, force or acceleration, depending on whether the force introduction part 123 consists of a diaphragm, force plate or seismic mass. The crystal array delivers its + and − charge to the amplifier 120 via contact springs 130. The amplifier with the plug 124 forms a single housing. Fitted in the amplifier housing 120 is the carrier plate 128, on which the various semiconductor elements and amplifiers are mounted with their associated components and interconnected by known methods.

The amplifier housing 120 is insulated from the transducer housing 121 by a glass or ceramic part 127. The plug socket 126 is likewise separated from the threaded part 125 by an insulator 131. The entire amplifier unit 120 is designed so that it can be fully assembled and tested outside the piezoelectric transducer 121, after which it is inserted in the transducer and seal-welded at the annular parts 132. A low-resistance cable connection can then be led to the current supply unit and signal processing.

From the foregoing description it will be clear that the invention opens up new possibilities in piezoelectric metrology. The use of controllable semiconductor elements constitutes an important step towards the replacement of the reed relays and switches hitherto employed in measuring instruments of this kind. This advance can be realized in existing measuring amplifiers, but in particular it makes possible the design of miniature amplifiers for installation in the immediate proximity of the piezoelectric transducer or actually inside it.

With the piezoelectric transducer and amplifier configuration proposed in accordance with the invention, systems are obtained which are applicable equally for charge and electrometer amplifiers. In addition it allows two-core or multi-core connections between the transducer/amplifier system and the matching power feed unit. The inaccuracies formerly associated with the notorious zeroing jump can be eliminated. When measuring rapid cyclic phenomena, such as pressure diagrams on internal combustion engines, it is quite possible to zero briefly after each operation. This eliminates any errors due to outside influences like temperature gradients etc.

Consequently, the invention not only makes possible more accurate and more reliable measurements, but also greatly simplified designing, with a favorable effect on both price and operational reliability. Besides this, however, it also permits entirely new approaches to measuring problems.

What is claimed is:

1. An amplifier measuring a circuit comprising:
a piezoelectric transducer for supplying output signals representative of an input quantity being measured;
an amplifier, having an input connected to said piezoelectric transducer, for providing an output representative of an operation effected on said output signals, said amplifier having an input impedance of at least $10^{10}$ ohm; and
means, connected to the input of said amplifier, for resetting the input voltage to a prescribed value, said means including at least one semiconductor element which receives a remote-controllable signal for controlling the resetting of said input voltage, said amplifier input further including a compensation input to which error signals are applied, for compensating for zero jumps in said semiconductor element.

2. An amplifier measuring circuit according to claim 1, wherein said amplifier comprises a charge amplifier having a storage capacitor connected thereto and wherein said semiconductor element is connected in parallel with said storage capacitor.

3. An amplifier measuring circuit according to claim 1, wherein said semiconductor element is a surface barrier field effect transistor.

4. An amplifier measuring circuit according to claim 1, wherein said semiconductor element is an insulated gate field effect transistor.

5. An amplifier measuring circuit according to claim 1, wherein said semiconductor element is responsive to a light input.

6. An amplifier measuring circuit according to claim 1, wherein said semiconductor element is responsive to an external magnetic field.

7. An amplifier measuring circuit according to claim 1, wherein said semiconductor element includes a temperature responsive resistance.

8. An amplifier measuring circuit according to claim 1, wherein the resistance of said semiconductor element is controllably adjustable.

9. An amplifier measuring circuit according to claim 1, further including connection means for supplying power from a power source to said circuit, said connection means being only a two-pole electrical connector for transmitting said receiving and representative output signals.

10. An amplifier measuring circuit according to claim 1, further including means for effecting said resetting from a location remote with respect to said amplifier by way of a cable.

11. An amplifier measuring circuit according to claim 10, further including connection means for supplying power from a power source to said circuit, said connection means being a two-pole electrical connector for transmitting said receiving and representative output signals, and means for converting current variations in the transmissions into voltage variations.

12. An amplifier measuring circuit according to claim 11, wherein said circuit is disposed as a self-contained unit in the plug of the housing of the transducer.

13. An amplifier measuring circuit comprising:
a piezoelectric transducer for supplying output signals representative of an input quantity being measured;
a charge amplifier having a feedback circuit between the input and output thereof which feedback circuit includes a capacitor connected in said feedback circuit of said amplifier, for providing an output representative of an operation effected on said output signals, said charge amplifier having an input impedance of at least $10^{10}$ ohm; and
a controlled semiconductor element connected across said capacitor for controlling the resetting of the energy stored therein,
said charge amplifier further including a compensation input to which error signals are applied, for compensating for zero jumps in said semiconductor element.

14. An amplifier measuring circuit according to claim 13, wherein said controlled semiconductor element includes a control input to which a signal for controlling the amount of impedance through said semiconductor across said capacitor is applied.

15. An amplifier measuring circuit according to claim 13, wherein said charge amplifier comprises a metal oxide field effect transistor connected across said transducer, with said storage element being connected to a control electrode of said transistor and to one side of said transducer and wherein said semiconductor element is coupled to an output electrode of said transistor.

16. An amplifier measuring circuit according to claim 15, wherein said semiconductor element comprises an insulated gate field effect transistor, the control electrode of which is resistively connected to the output electrode of said metal oxide field effect transistor.

17. An amplifier measuring circuit according to claim 16, further including a capacitor connected between said one side of said transducer on the control electrode of said insulated gate field effect transistor.

18. An amplifier measuring circuit according to claim 15, wherein said semiconductor element comprises a pair of oppositely poled series connected photo diodes connected across said storage element, and a light source connected to the output electrode of said transistor.

19. An amplifier measuring circuit according to claim 13, wherein said semiconductor element comprises an insulated gate field effect transistor having a source and a drain electrode connected in series with a resistance element across said storage element, and a gate electrode coupled to the output of said amplifier.

20. An amplifier measuring circuit according to claim 13, wherein said amplifier comprises an operation amplifier having a capacitor in the feedback path thereof, with said semiconductor element being connected across said capacitor and being controlled in response to the operational voltage for said circuit.

* * * * *